(12) United States Patent
Kikuchi (10) Patent No.: US 6,200,115 B1
(45) Date of Patent: Mar. 13, 2001

(54) SCROLL TYPE COMPRESSOR AND ROTATION PREVENTING MECHANISM USED IN THE SAME

(75) Inventor: Toshiyuki Kikuchi, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/366,196

(22) Filed: Aug. 4, 1999

(30) Foreign Application Priority Data

Aug. 4, 1998 (JP) .................................. 10-220070

(51) Int. Cl.[7] .............................. F04C 18/04; F16D 3/04
(52) U.S. Cl. ........................................ 418/55.3; 464/103
(58) Field of Search ............................ 418/55.3; 464/103

(56) References Cited

U.S. PATENT DOCUMENTS

| | | | |
|---|---|---|---|
| 3,647,268 | 3/1972 | Haines . | |
| 4,160,629 | 7/1979 | Hidden et al. | 418/55.3 |
| 4,259,043 | 3/1981 | Hidden et al. | 418/55.3 |
| 4,325,683 | 4/1982 | Miyazawa | 418/55.3 |
| 4,406,600 | 9/1983 | Terauchi et al. | 418/55.3 |
| 4,457,676 | 7/1984 | Hiraga | 418/57 |
| 4,468,181 | 8/1984 | Sakamoto | 418/55.3 |
| 4,472,120 | 9/1984 | McCullough | 418/83 |
| 4,474,543 | 10/1984 | Hiraga et al. | 418/55.3 |
| 4,492,543 | 1/1985 | Iimori et al. | 418/55.3 |
| 4,527,963 | 7/1985 | Terauchi | 418/100 |
| 4,545,746 | 10/1985 | Sugimoto et al. | 418/55.3 |
| 4,589,828 | 5/1986 | Sato et al. | 418/55.3 |
| 4,626,179 | 12/1986 | Terauchi | 418/55.6 |
| 4,645,435 | 2/1987 | Sugimoto | 418/55.3 |
| 4,934,909 | 6/1990 | Suzuki et al. | 418/55.3 |
| 5,102,315 | 4/1992 | Terauchi et al. | 418/55.3 |
| 5,221,198 | 6/1993 | Izumi et al. | 418/55.3 |
| 5,423,663 | 6/1995 | Fukui | 418/55.3 |
| 5,435,706 | 7/1995 | Matsumoto et al. | 418/55.3 |
| 5,738,504 | 4/1998 | Kitano | 418/55.3 |
| 5,758,978 | * 6/1998 | Satoda et al. | 418/55.3 |
| 5,911,566 | 6/1999 | Terauchi et al. | 418/55.3 |
| 5,915,933 | 6/1999 | Iizuka et al. | 418/55.3 |
| 5,938,418 | 8/1999 | Iizuka | 418/55.3 |

FOREIGN PATENT DOCUMENTS

| | | |
|---|---|---|
| 1960216 | 6/1971 | (DE) . |
| 0123407 | 10/1984 | (EP) . |
| 2455196 | 11/1980 | (FR) . |
| 59-183090 | 10/1984 | (JP) . |
| 63-61790 | 3/1988 | (JP) . |
| 63-154878 | 6/1988 | (JP) . |
| 63-179185 | 7/1988 | (JP) . |
| 63-266214 | 7/1988 | (JP) . |
| 6477779 | 3/1989 | (JP) . |
| 1219377 | 9/1989 | (JP) . |
| 01271679 | 10/1989 | (JP) . |
| 2308990 | 12/1990 | (JP) . |
| 5126040 | 5/1993 | (JP) . |
| 05087131 | 6/1993 | (JP) . |
| 533811 | 9/1993 | (JP) . |
| 7019249 | 1/1995 | (JP) . |
| 093106585 | 2/1997 | (JP) . |
| 881409 | 2/1980 | (RU) . |

OTHER PUBLICATIONS

Improvement of Scroll Compressor for Vehicle Air Conditioning Systems—Society of Automotive Engineers, Inc.. 1997.

* cited by examiner

Primary Examiner—John J. Vrablik
(74) Attorney, Agent, or Firm—Baker Botts L.L.P.

(57) ABSTRACT

A ball coupling constituting a rotation preventing mechanism (77) includes a first annular race section (59, 79) having a thrust ball transfer surface formed on one surface thereof, a second annular race section (61, 81) having a ball transfer surface formed on one surface thereof confronting the one surface of the first race section and thrust balls (67) interposed between the first and second race sections (79, 81). At least one of the first and second race sections has a cross sectional shape such that the central portion of the other surface (87) thereof confronting the one surface is a recessed groove (89). A scroll type compressor includes the rotation preventing mechanism on the back surface of a movable scroll member.

8 Claims, 8 Drawing Sheets

SCROLL TYPE COMPRESSOR AND ROTATION PREVENTING MECHANISM USED IN THE SAME

BACKGROUND OF THE INVENTION

1. Field of the Invention

The present invention relates to a rotation preventing mechanism used to support a driving mechanism such as a scroll compressor and the like. More particularly, the present invention relates to a ball coupling as a rotation preventing mechanism for improving the assembling properties thereof when it is mounted on a structural member.

2. Description of the Related Art

Conventionally, scroll type compressors include a pair of scroll members which confront each other and execute a turning motion in which the rotation of one of the scroll members about its own axis is prevented with respect to the other. One of the pair of scroll members is a stationary swirl member fixed to a housing or the like and the other is a movable swirl member driven by a driving mechanism while its rotation on its own axis is prevented by a rotation preventing mechanism.

The rotation preventing mechanism of the conventional scroll type compressors is disposed on the side (back surface) of the movable swirl member which is opposite to the side thereof confronting the stationary swirl member in order to prevent the rotation of the movable swirl member on its axis. The movable swirl member executes a relative circular motion in confrontation with the stationary swirl member.

The conventional rotation preventing mechanism is composed of a ball coupling, and a pair of rings and a pair of thrust races are formed as separate members. The pair of rings accommodate thrust balls 71 therebetween and the thrust races are disposed outside the rings. One of the rings is fixed to the inner wall of a front housing by a pin together with one of the thrust races, whereas the other of the rings is fixed to the back surface of the movable scroll member by a pin together with the other of the thrust races.

However, the thrust races as the components of the ball coupling of the conventional scroll type compressor have a drawback that they are gradually deformed because they are subjected to the thrust load of the movable scroll member through the thrust balls when the compressor is operated.

Each of the thrust races according to prior art is composed of an annular steel sheet member having a rectangular cross section. Conventionally, the thrust race is subjected to heat treatment to increase the strength thereof. However, the inside of the race sheet member of the thrust race remains as a residual austenite phase as it is, while the surface phase of the race sheet member is transformed to martensite.

Therefore, the scroll type compressor has a drawback that when it is operated, the volume of the austenite phase remaining at the central portion of the thrust race is expanded when the austenite phase is transformed to the martensite phase, whereby the thrust race is deformed.

SUMMARY OF THE INVENTION

It is an object of the present invention to provide a ball coupling capable of improving the durability of products such as a scroll type compressor and the like using a ball coupling as a rotation preventing mechanism in the operation thereof.

It is another object of the present invention to provide a scroll type compressor with a long service life which uses the rotation preventing mechanism having improved durability.

According to an aspect of the present invention, there is provided a scroll type compressor for compressing and discharging refrigerant drawn in by executing a turning motion by one of a pair of scroll members disposed in confrontation with the other while preventing the rotation of the one of the scroll members on its axis with respect to the other by a rotation preventing mechanism. In the scroll type compressor, the rotation preventing mechanism consists substantially of a ball coupling. The ball coupling comprises a first annular race section having a thrust ball transfer surface formed on one surface thereof, a second annular race section having a ball transfer surface formed on one surface thereof confronting the one surface of the first race section, and thrust balls interposed between the first and second race sections. In the rotation preventing mechanism, at least one of the first and second race sections has a cross sectional shape such that the central portion of the other surface thereof confronting the one surface is recessed.

According to another aspect of the present invention, there is provided a rotation preventing mechanism which consists substantially of a ball coupling. The ball coupling comprises a first annular race section having a thrust ball transfer surface formed on one surface thereof, a second annular race section having a ball transfer surface formed on one surface thereof confronting the one surface of the first race section, and thrust balls interposed between the first and second race sections. In the rotation preventing mechanism, at least one of the first and second race sections has a cross sectional shape such that the central portion of the other surface thereof confronting the one surface is recessed.

DESCRIPTION OF THE PREFERRED EMBODIMENT

Prior to the description of an embodiment according to the present invention, a conventional scroll type compressor and a rotation preventing mechanism used therein will be described with reference to FIGS. 1 to 3 so that the present invention can be easily understood.

Figure 1:
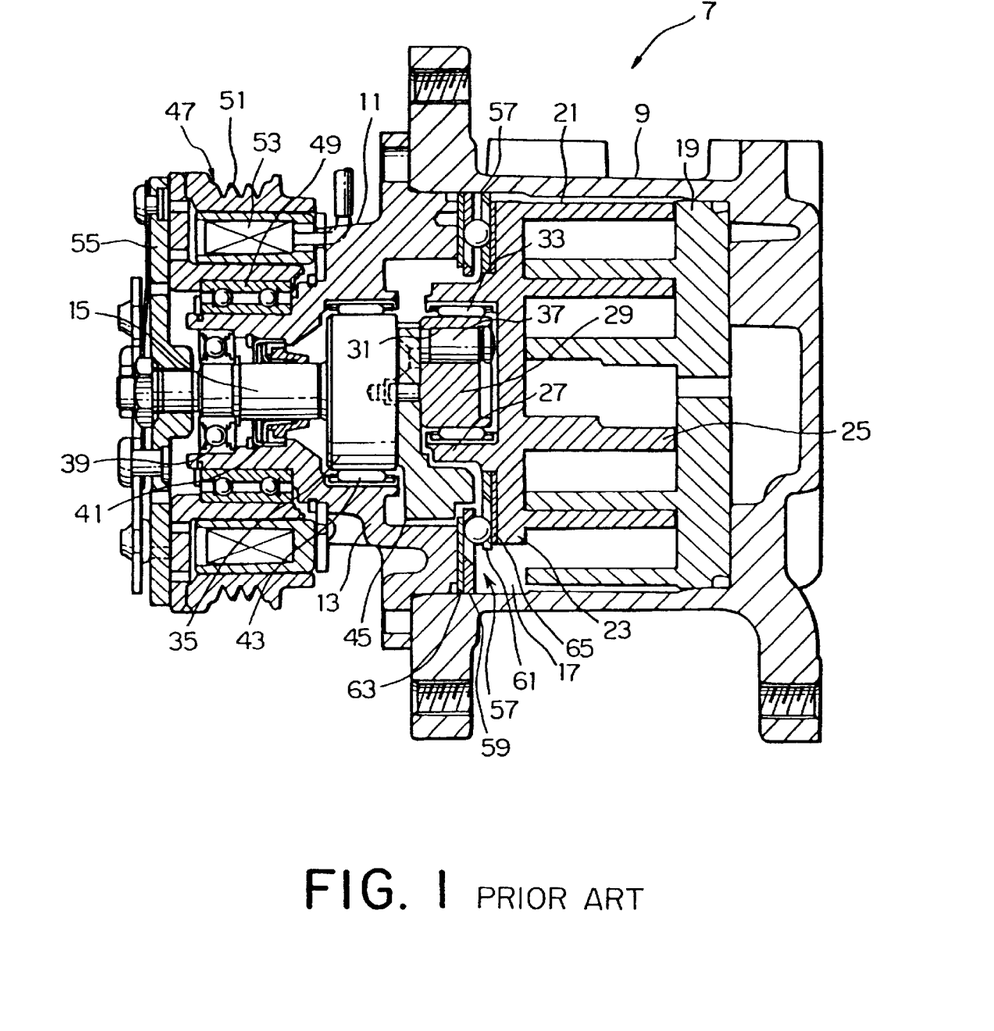
FIG. 1 is a sectional view showing a conventional scroll type compressor.

Referring to FIG. 1, a scroll type compressor 7 includes a casing 9 constituting a shell having an opening at one end thereof, a front housing 11 disposed to the opening at the one end of the casing 9, and a crank shaft 15 passing through a projecting section 13 of the front housing 11. A crank chamber 17 is defined and formed by the casing 9 and the front housing 11 and contains a stationary swirl member 19 fixed to the casing 9 and a movable swirl member 21. The movable swirl member 21 is disposed in confrontation with the stationary swirl member 19 and makes a relative turning motion about the axis of the stationary swirl member 19.

The movable swirl member 21 includes a side plate 23, a swirl member 25 disposed to one surface of the side plate 23 and a boss section 27 formed so as to project from the other surface of the side plate 23. The boss section 27 contains an eccentric bushing 29. The eccentric bushing 29 has a through hole 31 formed to the eccentric position thereof as well as the periphery thereof is rotatably supported through a bearing 33.

The crank shaft 15 has a large diameter section 35 formed at an end of the crank chamber 17, and a crank pin 37 is disposed to the side of the large diameter section 35 opposite to the crank shaft 15 at a position which is eccentric to the axis of the crank shaft 15.

The crank pin 37 is inserted into the through hole 31 of the eccentric bushing 29. The crank shaft 15 in the projecting section 13 is supported by a bearing 39 and has a seal member 41 disposed therearound. The large diameter section of the crank shaft 15 is supported by the front housing 11 through a bearing 43. Note, the scroll type compressor 7 includes a counterbalance weight 45 to maintain balance between the movable swirl member 21 and the shaft.

An electromagnetic clutch 47 is disposed around the projecting section 13 of the front housing 11. The electromagnetic clutch 47 includes an annular hollow rotor 51 disposed around the projecting section 13 through a bearing 49, an electromagnet device 53 disposed in the rotor 51, and a clutch plate 55 disposed in confrontation with the outer end surface of the rotor 51. The clutch plate 55 is fixed to one end of the crank shaft 15 by a fixing member at the center thereof.

Further, a rotation preventing mechanism 57 is disposed around the boss section 27 on the other end of the side plate 23 of the movable swirl member 21 and on the inner wall of the front housing 11.

Figure 2:
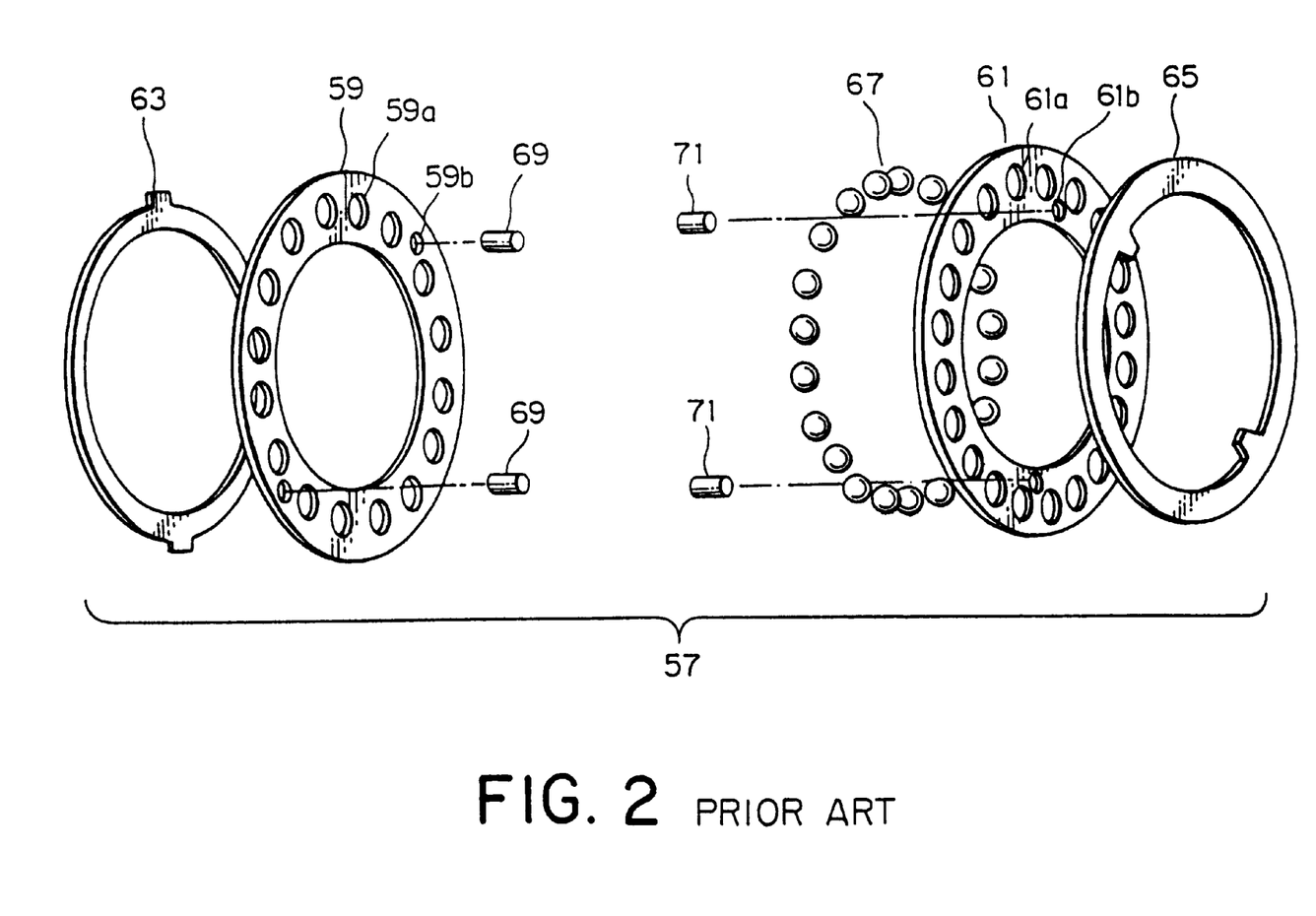
FIG. 2 is an exploded assembly perspective view showing a ball coupling of FIG. 1.

Referring to FIG. 2, the conventional rotation preventing mechanism 57 is disposed on the side (backside) of the movable swirl member 21 which is opposite to the side thereof confronting the stationary swirl member 19 to prevent the rotation of the movable swirl member 21 on its own axis. The movable swirl member 21 makes a relative circular motion in confrontation with the stationary swirl member 19.

The conventional rotation preventing mechanism 57 is composed of a ball coupling, which has a pair of rings 59 and 61, a pair of thrust races 63 and 65, and thrust balls 67 accomodated therebetween. The pair of rings 59 and 61, and a pair of thrust races 63 and 65 are formed as separate members. The pair of rings 59 and 61 accommodate the thrust balls 67 therebetween, and the thrust races 63 and 65 are disposed outside the rings 59 and 61, respectively. The ring 59 is fixed to the inner wall of the front housing 11 together with the thrust race 63, whereas the ring 61 is fixed to the back surface of the movable swirl member 21 by a pin 71 together with the thrust race 65.

Since the thrust races 63 and 65 as the components of the ball coupling of the conventional scroll type compressor are subjected to the thrust load of the movable scroll member through the thrust balls 67 when the compressor is operated, a drawback arises in that the thrust races 63 and 65 are gradually deformed. The drawback will be specifically described with reference to FIG. 3.

Figure 3:
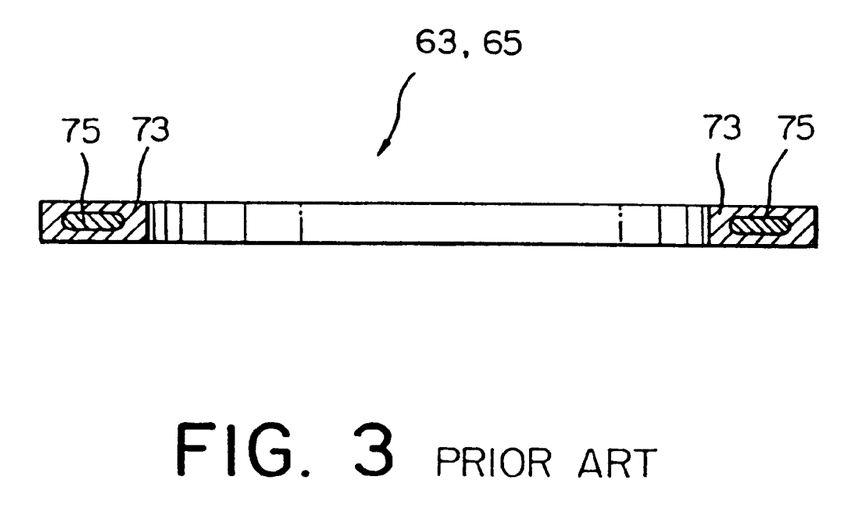
FIG. 3 to a sectional view showing the thrust race of the ball coupling of FIG. 2.

Referring to FIG. 3, each of the conventional thrust races 63 and 65 is composed of an annular steel plate member having a rectangular cross section.

Conventionally, the thrust races 63 and 65 are subjected to heat treatment to increase the strength thereof. In the heat treatment, however, an interior portion 75 of the race plate members of the thrust races 63 and 65 remains as an austenite phase as it is, while a surface phase 73 thereof is transformed into martensite.

Therefore, when the scroll type compressor is operated, the volume of the thrust races is expanded at the time the austenite phase remaining in the central portion of the thrust races is transformed into a martensite phase, by which the drawback of the thrust races being deformed occurs.

The embodiment of the present invention will be described with reference to FIGS. 4 and 5.

Since the scroll type compressor according to the embodiment of the present invention is arranged similarly to the conventional one except for a rotation preventing mechanism, the description thereof is omitted.

Figure 4:
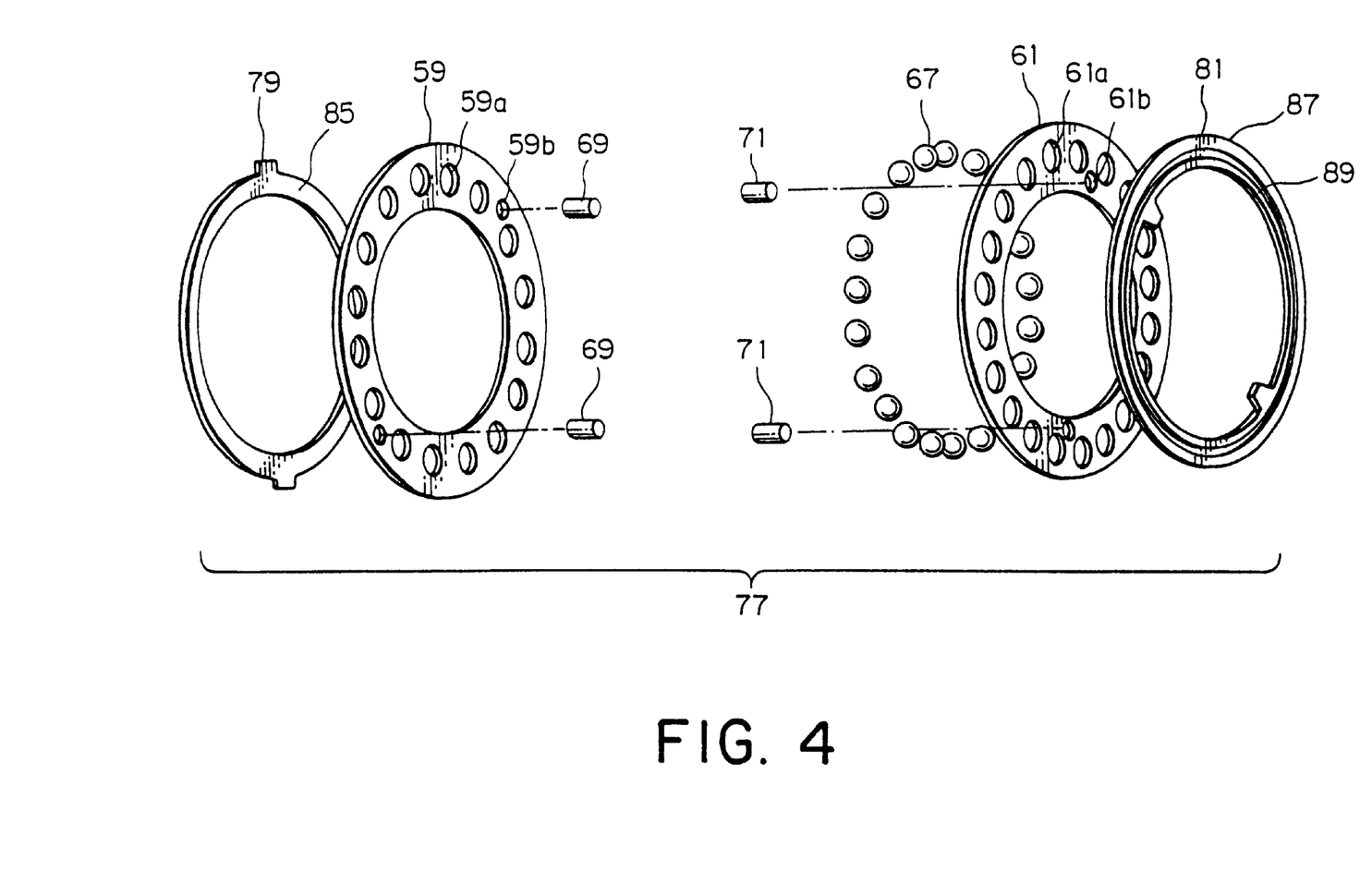
FIG. 4 is an exploded assembly perspective view showing a ball coupling according to an embodiment of the present invention.

Referring to FIG. 4, a rotation preventing mechanism 77 of the scroll type compressor according to the embodiment of the present invention includes a stationary race as a first race section composed of a thrust race 79 fixed to the inner wall of a front housing 11, a movable race as a second race section composed of a thrust race 81 disposed to a movable swirl member 21, a pair of rings 59 and 61 interposed between the stationary race and the movable race, and the thrust balls 67 accommodated between the rings 59 and 61 in the similar manner being described in conjunction with FIG. 2.

Referring again to FIG. 4, the rotation preventing mechanism 77 is disposed on the side (backside) of the movable swirl member 21 (FIG. 1) which is opposite to the side thereof confronting a stationary swirl member 19 (FIG. 1) to prevent the rotation of the movable swirl member 21 on its axis. The movable swirl member 21 makes a relative circular motion in confrontation with the stationary swirl member 19 (FIG. 1).

The rotation preventing mechanism 77 is composed of a ball coupling, and the pair of rings 59 and 61 and the pair of thrust races 79 and 81 are formed as separate members. The thrust race 79 and the ring 59 are fixed to the inner wall of the front housing 11 (FIG. 1) by pins 69. In contrast, the thrust race 81 and the ring 61 are fixed to the back surface of the movable swirl member 21 (FIG. 1) by pins 71. To assemble the rotation preventing mechanism 77, the pair of rings 59 and 61 accommodate the thrust balls 67 therebetween and the thrust races 79 and 81 are disposed outside the rings 59 and 61, respectively. The ring 59 is fixed to the inner wall of the front housing 11 (FIG. 1) by the pins 69, whereas the ring 61 is fixed to the back surface of the movable swirl member 21 (FIG. 1) by the pins 71, whereby the rotation preventing mechanism 77 is completed.

Figure 5A:
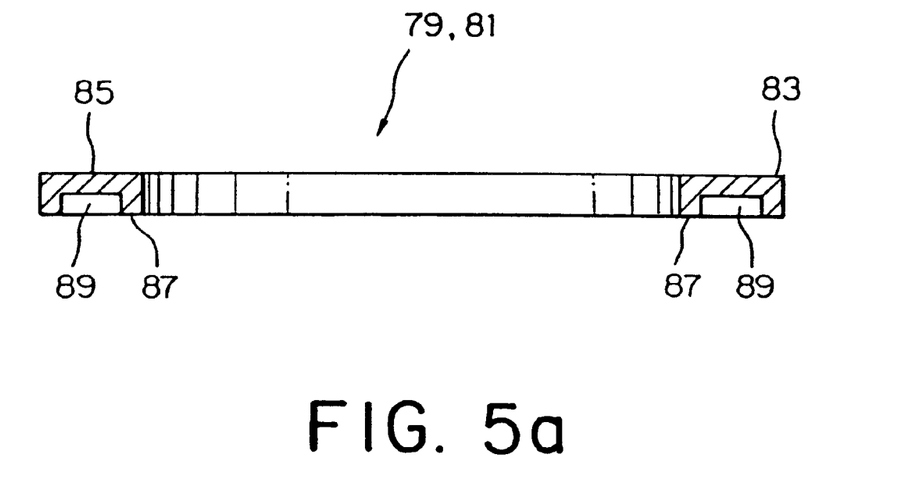
FIGS. 5*a–d* are sectional views showing the thrust race of the ball coupling of FIG. 4.
Figure 5B:
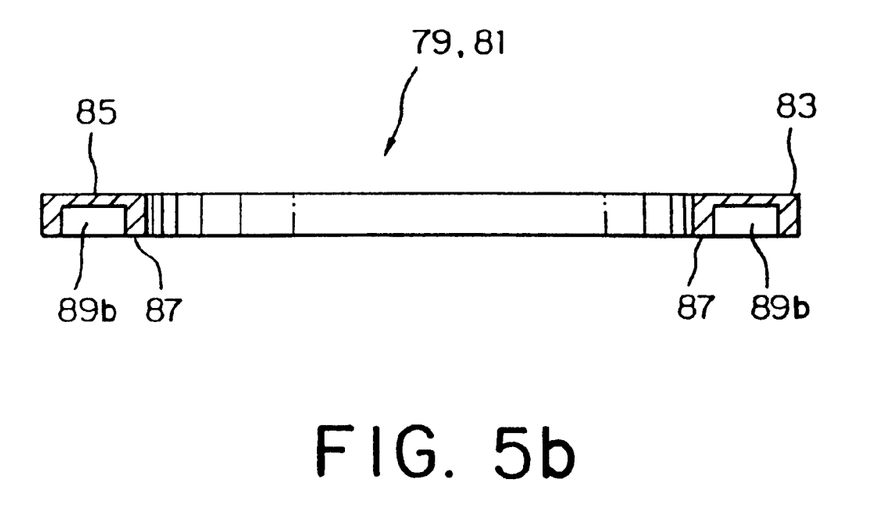
Figure 5C:
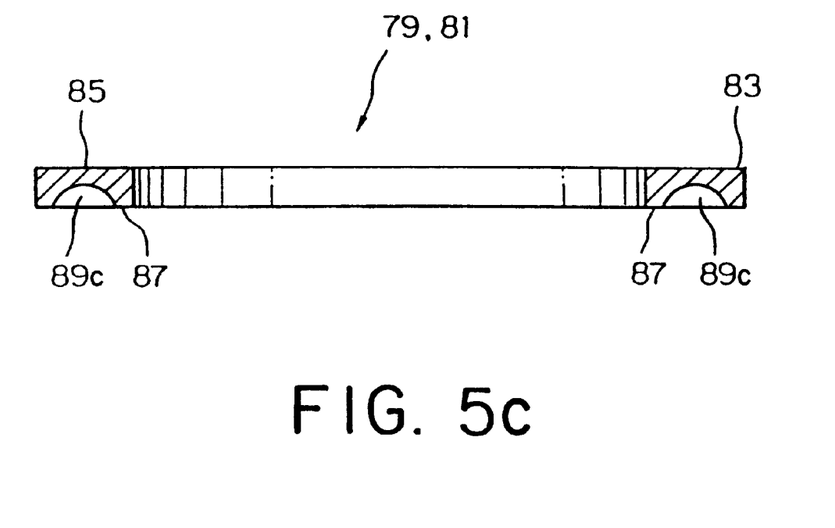
Figure 5D:
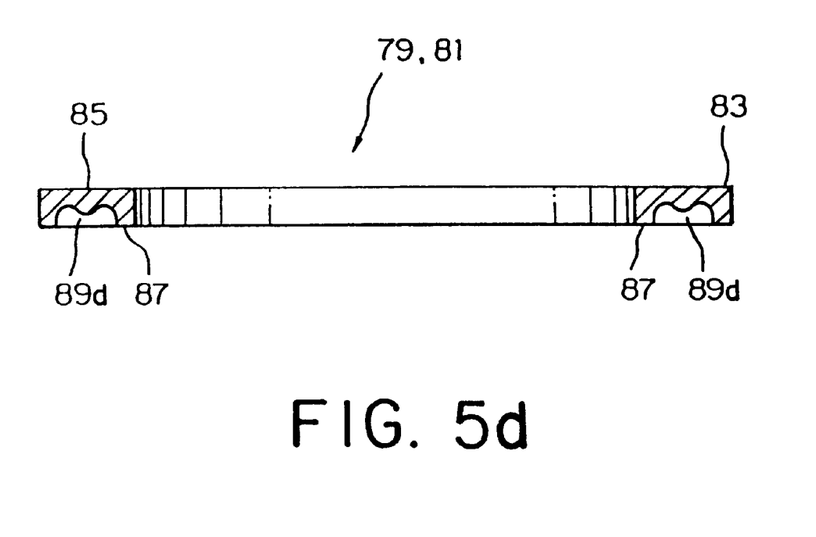

Referring to FIG. 5a each of the thrust races 79 and 81 of the ball coupling includes an annular race plate member 83. The race plate member 83 has a flat thrust ball transfer surface 85 which is formed to one side thereof and comes into contact with the thrust balls 67, whereas a groove 89a is formed to the central portion of the surface of the race plate member 83 on the other side thereof. The groove 89 is recessed toward the one side of the race plate member 83 and is formed annularly along the peripheral direction of a plate surface 87.

In the embodiment of FIG. 5a the groove 89a has a rectangular shape in section. However, the sectional shape of the groove need not be limited to that illustrated in FIG. 5a but may be any other appropriate shape, for example, a square shape, a semi-circular shape, or a free curve shape as shown by elements 89b, 89c, and 89d of FIGS. 5b–5d, respectively.

According to the race plate member 83 of the thrust race of the ball coupling of the embodiment of the present invention arranged as described above, since the central portion thereof is recessed to form the groove 89a, even if it is subjected to the same heat treatment as in the conventional heat treatment, an austenite phase does not remain at the central portion of the groove 89a.

Accordingly, when the compressor is operated, the race plate member is not thermally deformed, whereby the deformation of the thrust races 79 and 81 caused by the phase transformation can be prevented when the compressor is operated.

As described above, according to the present invention, since the groove is formed to the central portion of the plate member of the thrust race, the rotation preventing mechanism can be provided which is composed of the ball coupling capable of improving the durability of products using the ball coupling employing the thrust race such as a scroll type compressor and the like. In addition, the scroll type compressor can be also provided which uses the rotation preventing mechanism.

What is claimed is:

1. A rotation preventing mechanism consisting substantially of a ball coupling, said ball coupling comprising a first annular race section having a substantially flat thrust ball transfer surface formed on one surface thereof, a second annular race section having a substantially flat thrust ball transfer surface formed on one surface thereof confronting the one surface of the first race section, and a plurality of thrust balls interposed between the first and second race sections, wherein at least one of the first and second race sections has a cross sectional shape, such that an annular central portion of the other surface thereof confronting the one surface is recessed.

2. A rotation preventing mechanism according to claim 1, wherein at least one of the first and second race sections is made of steel.

3. A rotation preventing mechanism according to claim 2, wherein the steel race section of at least one of the first and second race sections comprises a martensite phase formed throughout said at least one race by heat treatment.

4. A rotation preventing mechanism according to claim 2, wherein said cross sectional shape has a recessed portion having a shape selected from the group consisting of a square shape, a semi-circular shape, and a free curve shape.

5. A scroll type compressor for compressing and discharging drawn in refrigerant by executing a turning motion by one of a pair of scroll members disposed in confrontation with each other while preventing the rotation of the one of the scroll members on its axis with respect to other by a rotation preventing mechanism consisting substantially a ball coupling, said ball coupling comprising:

a first annular race section having a substantially flat thrust ball transfer surface formed on one surface thereof;

a second annular race section having a substantially flat thrust ball transfer surface formed on one surface thereof confronting the one surface of said first race section; and a plurality of thrust balls interposed between said first and second race sections, wherein at least one of said first and second race sections has a cross sectional shape, such that an annular central portion of the other surface thereof confronting the one surface is recessed.

6. A scroll type compressor according to claim 5, wherein said cross sectional shape has a recessed portion having a shape selected from the group consisting of a square shape, a semi-circular shape, and a free curve shape.

7. A scroll type compressor according to claim 5, wherein at least one of said first and second race sections is made of steel.

8. A scroll type compressor according to claim 7, wherein the steel race section of at least one of said first and second race sections comprises a martensite phase formed throughout said at least one race by heat treatment.

* * * * *